April 28, 1959 R. J. BLACKMAN 2,883,790
FAN-TYPE INSECT CATCHING DEVICE
Filed Nov. 23, 1956 2 Sheets-Sheet 2
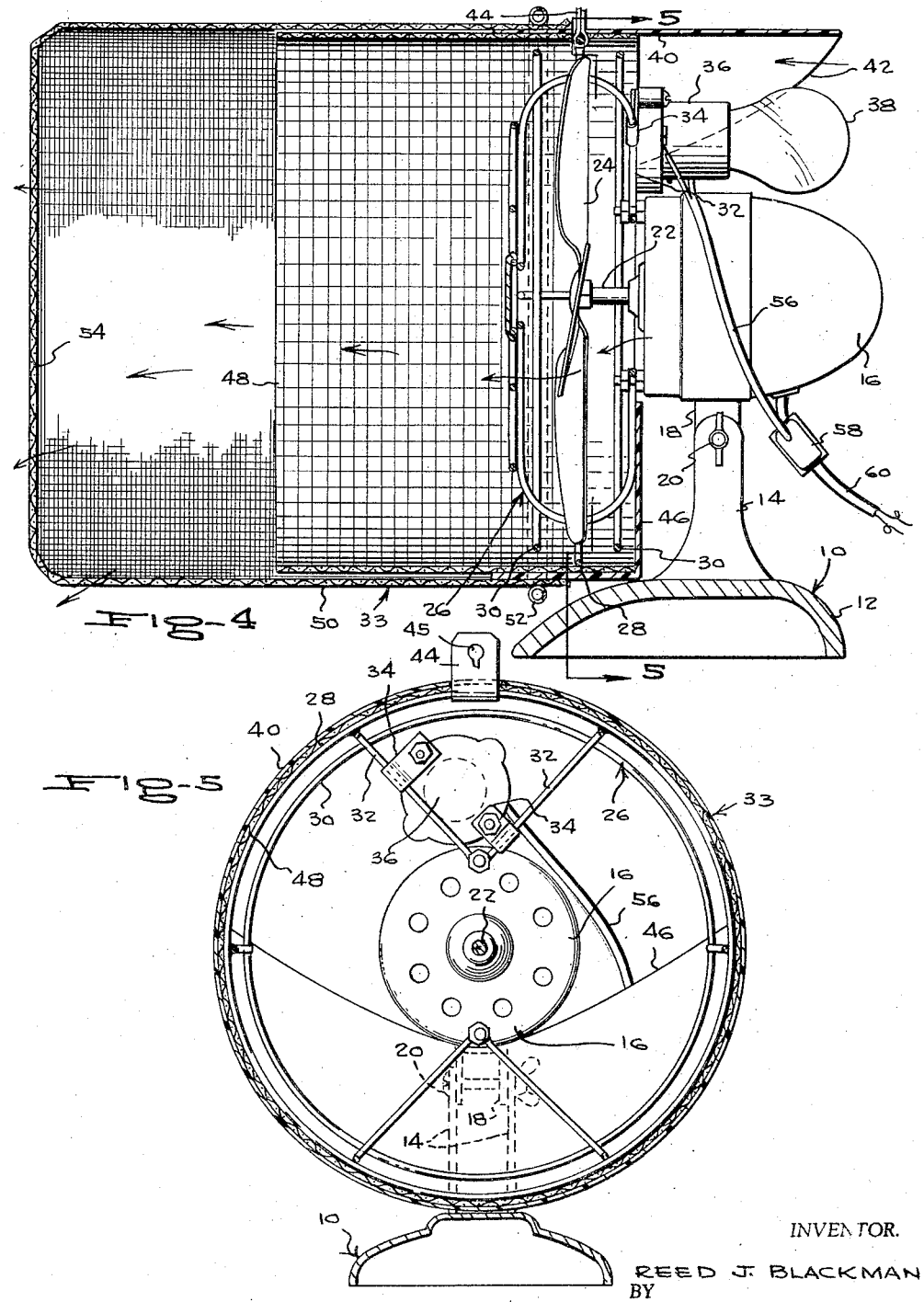
INVENTOR.
REED J. BLACKMAN
BY
McMorrow, Berman & Davidson
ATTORNEYS

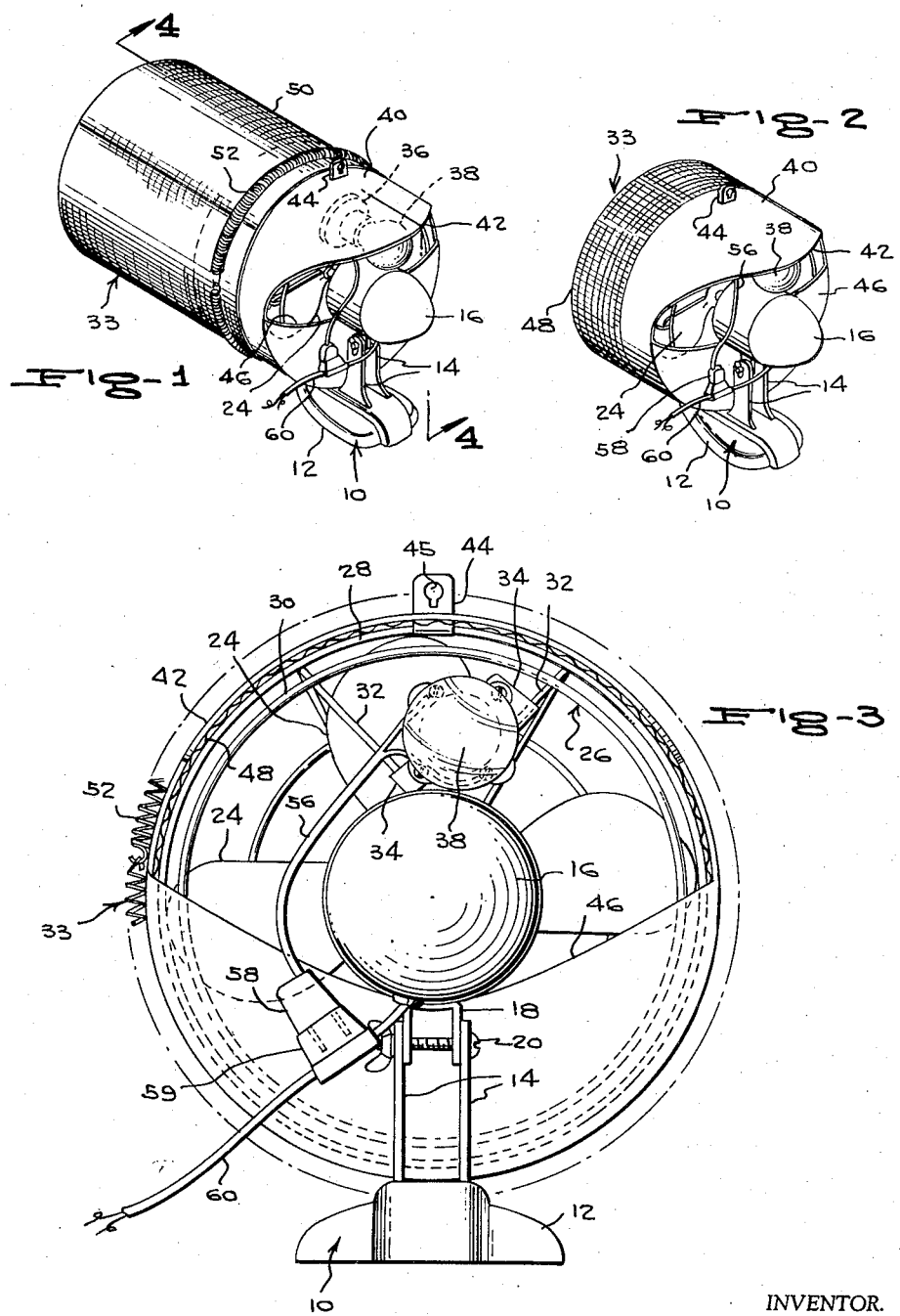

United States Patent Office 2,883,790
Patented Apr. 28, 1959

2,883,790

FAN-TYPE INSECT CATCHING DEVICE

Reed J. Blackman, Stover, Mo.

Application November 23, 1956, Serial No. 623,886

1 Claim. (Cl. 43—113)

This invention relates to a device for attracting and catching insects, and more particularly to an insect catcher designed as an attachment to a conventional, oscillating electric fan or alternatively, to a conventional fan of the box type.

Among important objects of the present invention are the following:

To provide an insect-catching device in the form of an attachment to a wholly conventional electric fan;

To permit the device to be attached to or removed from the fan with speed and ease and without the requirement of special skills, thus to permit the ordinary householder to convert an electric fan for use, either temporarily or permanently, as an insect catcher;

To provide an efficient mode of operation designed to attract a maximum number of insects;

To permit the device to be mounted at any location desired and to be fully portable;

To design the device for manufacture at a relatively low cost;

To provide a trapping compartment for the insects which will be adjustable in size as desired;

To permit one of the components of the trapping compartment to be completely removed if desired, so that the insects can be blown directly through the compartment in special situations, as for example when it is desired to blow the insects directly into an adjacent body of water;

To permit, when the device is associated with an oscillating electric fan, the regular oscillation of the fan if desired, so that the fan may still be advantageously used for circulating air; and To permit said association of the device with a conventional electric fan without requiring any modification or redesign whatever of the fan.

Other objects will appear from the following description, the claim appended thereto, and from the annexed drawing, in which like reference characters designate like parts throughout the several views, and wherein:

Figure 1 is a perspective view of an insect catcher according to the present invention;

Figure 2 is a perspective view of the device with the outer section of the trapping compartment removed;

Figure 3 is an enlarged rear elevational view of the device;

Figure 4 is a longitudinal sectional view substantially on line 4—4 of Figure 1 on the same scale as Figure 3; and Figure 5 is a transverse sectional view on the same scale as Figure 3, substantially on line 5—5 of Figure 4.

Designated generally at 10 is a conventional oscillating electric fan. The invention is shown applied to a fan of this type, but could be applied with equal facility to a box type electric fan, as will be presently made apparent.

Fan 10 has the usual weighted base 12, from which extends upwardly transversely spaced standards 14 defining a support post. The fan motor 16 has a bracket 18 of inverted U-shape secured to its underside and embraced by the standards 14, transversely aligned openings being provided in the standards and the bracket legs to receive a connecting bolt 20 provided with a wing nut, said bolt permitting the fan to be tilted about an axis extending horizontally, transversely of the standards, with the wing nut clamping the bracket to the standards in selected positions to which the motor and fan blade assembly are so tilted.

Projecting forwardly from motor 16 is the shaft 22 of the motor to which is secured the hub of a fan blade assembly including plurality of pitched blades 24. A conventional wire guard 26 encloses the fan blade assembly and includes, in planes perpendicular to the length of shaft 22, circular guard rings including a middle ring 28 (Figure 4) and front and back rings 30 slightly smaller in diameter than the middle ring. Additional, smaller rings are provided in front of the fan blade assembly, and supporting the several rings in concentric relation to the fan blade assembly are wire support rods 32 (see Figure 5) connected to the motor housing and extending outwardly from the motor housing, said rods 32 being welded or otherwise fixedly secured to the several guard rings.

All this is per se conventional, the device constituting the invention being particularly adapted for removable attachment to an oscillating fan 10 of the type illustrated.

The insect catcher has been generally designated at 33 and includes an electric light rearwardly of the fan blade assembly, for attracting insects to an area in which they will be entrained in an air current caused by rotation of the fan blade assembly, said current passing from right to left in Figure 4.

The light means includes a pair of brackets 34 (Figure 5) in the form of U-clamps, attached to the upper support rods 32 and connected to diametrically opposite portions of the base of a lamp socket 36 into which is screwed an electric light bulb 38 facing rearwardly of the fan as shown in Figure 4.

A hood 40 may be formed of plastic or any other suitable material, and overlies the electric light bulb as shown in Figures 1 and 2. The hood is curved in concentric relation to the fan blade assembly, and is provided with a rearwardly bowed back edge 42, so that the hood is progressively decreased in width from a location directly above the lamp bulb 38 to the locations at opposite sides of the motor 16.

Adjacent the forward edge of the hood, at the top thereof, there is an upwardly projecting U-shaped bracket 44 (see Figure 4) which extends upwardly through a slot in the hood and which is mounted upon the middle guard ring 28, thus properly locating the hood in respect to the fan blade assembly. The bracket 44 includes transversely therethrough a "keyhole" aperture portion 45 facilitating the hanging of the insect catcher in suitable hung relationship on a nail, hook or the like.

The hood 40, as will be noted from Figures 1 and 2, is extended through the full circumference of the fan blade assembly, with the upper portion, as previously mentioned, being projected rearwardly above the bulb 38, the side and bottom portions being substantially narrower. To the lower half of the hood, there is integrally secured a closure member 46, overlying the back of the fan blade assembly as shown in Figures 1 and 4. The closure member 46 is approximately crescent-shaped, and it will be apparent that by reason of the closure member 46, insects are required to approach the fan in the area of the lamp bulb, with the several insects being thus entrained in the air current, and being pulled into the device directly below the widest portion of the hood, at opposite sides of the lamp bulb 38. However, the use of the crescent-shaped closure member 46 is optional inasmuch as the insect catcher could operate efficiently without the closure member 46 being present.

Referring to Figures 2 and 4, inserted between the hood and the middle guard ring is the rear end portion of a cylindrical inner section 48 of a trapping enclosure or compartment. This is formed open at its opposite ends, and is of a diameter substantially equal to the diameter of the annular hood 40. The section 48 telescopes within the forward portion of the hood as shown in Figure 4, with the mounting bracket 44 passing through registering openings of the section 48 and hood 40.

The section 48 projects forwardly a substantial distance beyond the fan blade assembly, and at its forward end telescopes within an outer section 50 also of cylindrical formation, said outer section 50 being open at its inner end and receiving, at said inner end thereof, the forward portion of the annular hood 40. The outer section 50 abuts at its rear end against the bracket 44 in a typical mounting of the outer section, and circumposed about the inner end portion of the outer section 50 is a continuous, annular clamp means in the form of a contractile spring 52. Spring 52, when applied in the position shown in Figures 1 and 4, clampably engages the outer section 50 to the hood 40, thus holding the hood 40, the inner section 48, and the outer section 50 in assembled relation.

The outer section 50 projects a substantial distance beyond the inner section 48, and at its outer end is permanently closed by an end wall 54.

The sections 48, 50 of the trapping enclosure are formed of a mesh material, such as screen wire, and it will be understood that the fineness of the mesh will be at the option of the manufacturer or user.

To provide power for the lamp bulb 38, there is provided an insulated conductor 56, the two wires of which are connected to the terminals of the lamp socket 36. The conductor 56 is provided with a conventional electric plug 58 (see Figure 3) which plugs into a receptacle 59 the respective terminals of which are electrically connected to the two wires of the conductor 60 that extends to the motor 16.

With minor modifications, the device could be adapted with equal facility to incorporation in a box-like electric fan. When incorporated in a box fan, the fan could, if desired, be secured by suitable means to the roof of a porch, or other enclosure in which it is desired to attract and catch the insects. The box fan could even be secured to the underside of a porch floor, where the porch is raised and has an open crawl space below the same. Then again, a box type electric fan could be secured to the underside of a porch table, or other piece of furniture, could be mounted in a window, or could be otherwise located. Whether the fan is of the oscillating or box type, the device is fully portable, and can be used at any location desired. It might be desired, for example, that a fan of the type shown be used on a fishing dock, during night fishing. In these circumstances, it may be desired to remove the outer section 50 of the trapping enclosure, with the fan being arranged to direct the outflow of air against the water. Insects attracted to the area of the light bulb will be entrained in the air current, and will be blown through the fan blade assembly directly into the water, so as to attract fish in the vicinity.

The device could be used, further, as an excellent catching device in the area of a porch light, catching insects about a door opening onto the porch. Then again, the device may be used as a lawn or patio light, to illuminate the lawn or patio while at the same time catching insects.

Another desirable characteristic of the device resides in its compactness, the device being little greater than the size of an ordinary electric fan. The device can be attached to a conventional electric fan with little speed and ease, and could be manufactured as an accessory separate and distinct from a conventional oscillating fan. In these circumstances, one may readily attach the device to the fan without the requirement of special skills, by merely following simple directions. In connection with this feature of the invention, one could if desired mount the device temporarily upon the electric fan, and could remove the same from the fan whenever it is not desired to catch insects. It is even possible to merely remove the outer section, permitting normal use of the electric fan with the electric bulb turned off.

Even when the device is in use as an insect catcher, with the parts assembled as in Figure 4, the fan could be permitted to oscillate, thus to circulate air while at the same time attracting insects. It may be noted, in this regard, that the bulb is so arranged as to be particularly conspicuously located, being fully open to the back and to the sides of the device, thus to attract a maximum number of insects in the area.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claim.

What is claimed is:

An insect trap for attachment to an electric fan having a fan blade assembly, guard rings extending thereabout, and support rods for the guard rings, comprising: a pair of separate, spaced brackets each of which is in the form of a U-clamp, said brackets being adapted to be detachably connected to separate support rods; a lamp socket having its base connected at angularly spaced locations thereon to said brackets, said socket projecting horizontally from the brackets; a lamp bulb engaged in the socket; a curved, imperforate hood overlying the lamp bulb, said hood being adapted for extension about the fan blade assembly, the hood including a connecting bracket projecting inwardly from the hood and adapted to connect the same to a selected one of the guard rings; a cylindrical, foraminous, open-ended trapping enclosure section telescoped at one end into the hood for disposition between the hood and said one guard ring, said last named bracket projecting through said foraminous section so as to connect the same to the hood and fan blade assembly; a second cylindrical, foraminous section closed at one end, the other end of the second section being open and receiving said hood and the first section; and an annular clamp extending about the second section and hood and frictionally, releasably binding the second section against the hood.

References Cited in the file of this patent

UNITED STATES PATENTS

| | | |
|---|---|---|
| 1,224,062 | Boor | Apr. 24, 1917 |
| 1,671,404 | Cherry | May 29, 1928 |
| 2,493,203 | Madeksho | Jan. 3, 1950 |

FOREIGN PATENTS

| | | |
|---|---|---|
| 358,817 | Italy | May 2, 1938 |
| 717,903 | France | Jan. 16, 1932 |